UNITED STATES PATENT OFFICE.

EDGAR DE LAIRE, OF PARIS, FRANCE.

IONONE DERIVATIVE.

SPECIFICATION forming part of Letters Patent No. 600,429, dated March 8, 1898.

Application filed November 3, 1897. Serial No. 657,232. (No specimens.)

*To all whom it may concern:*

Be it known that I, EDGAR DE LAIRE, chemist, a citizen of the Republic of France, residing at Paris, France, have invented an Improvement in Ionone Derivatives, of which the following is a specification.

In the specification United States Patent No. 556,943, of March 24, 1896, Tiemann has shown that pseudo-ionone ($C_{13}H_{20}O$) is converted by the action of acids into an isomeric ketone, which he has called "ionone," having the same formula $C_{13}H_{20}O$ and possessing an odor of violets. In the specification No. 556,944 of the same date Tiemann has further shown that compounds of the citral series (to which belongs pseudo-ionone formed by the condensation of citral with acetone under the influence of alkaline reagents) are converted into isomerides by the action of acid condensing agents. He has specified the use of various acid condensing agents for effecting these changes—for example, sulfuric acid of various degrees of concentration. In the specification No. 556,944 he has quoted examples of isomerizations effected with sulfuric acid containing sixty per cent. and seventy per cent. of $H_2SO_4$.

When pseudo-ionone is treated with acids (chiefly sulfuric acid) of greater or less concentration, it is converted into ionone, the transformation being more or less complete, according to the quantity of acid employed, the temperature of the reaction, and the duration of the process. I have found that if when concentrated acids are employed the temperature of the reaction be allowed to approach that at which decomposition, resinification, or complete carbonization sets in or if the action of the acid be allowed to proceed for a sufficiently long time there will be found among the products of the reaction, besides ionone, oils the boiling-points and specific gravities of which are slightly higher than those of ionone. When pseudo-ionone is treated with dilute acids, this phenomenon is but little noticeable; but when, for example, sulfuric acid containing eighty per cent. of $H_2SO_4$ is used the change can be realized with certainty. I have observed that under these conditions the ionone which is formed in an early stage of the reaction can be transformed by pursuing this same reaction more or less completely into an isomerid. This isomerid, which I call "iso-ionone," can be obtained in a pure state from ionone by operating as follows: One part of ionone is slowly added drop by drop and with constant stirring to three or four parts of well-cooled ordinary commercial sulfuric acid, (66° Baumé.) The temperature of the mixture is allowed to reach 30° centigrade. The whole is then poured into water. The solution is extracted by a suitable solvent—ether, for example—and the solution thus obtained is washed and neutralized with a little sodium carbonate or sodium hydroxid solution. The solvent is distilled off, and the residue from the distillation is subjected to a rapid current of steam to separate from the resins the unaltered ionone and the iso-ionone produced. The mixture of ionone and iso-ionone thus obtained is fractionally distilled and the portion distilling off between 135° and 145° centigrade at a pressure of eighteen millimeters is collected as crude iso-ionone. This substance can be further purified by renewed fractional distillation and the purification completed by the following method: The crude iso-ionone is dissolved in alcohol and an aqueous solution of semicarbazid hydrochlorate containing an excess of sodium acetate is added to the alcoholic solution. A little more than one equivalent of semicarbazid hydrochlorate in proportion to the iso-ionone should be used. The semicarbazone of iso-ionone ($C_{13}H_{20}N.NH.CO.NH_2$) presently separates in the form of crystals. By recrystallizing several times from alcohol the semicarbazone of ionone is easily separated, for it is more soluble and crystallizes less easily than that of iso-ionone.

For a description of semicarbazids reference may be had to *Berichte d. Deutschen Chemischen Gesellschaft,* No. 28, page 1754.

By treating the semicarbazone of iso-ionone for some time with dilute sulfuric acid in a solution of ether and alcohol it is decomposed into semicarbazid sulfate and iso-ionone, and this latter is isolated in the known manner.

The boiling-point of pure iso-ionone is about 140° centigrade at a pressure of eighteen millimeters. The specific gravity of the compound is 0.946 at 17° centigrade and the index of refraction is n D=1.521.

The melting-point of the parabromophenylhydrazone of iso-ionone is 114° to 115° centigrade, and that of the semicarbazone of iso-ionone is 148° centigrade. The melting-point of the parabromophenylhydrazone of ionone, on the other hand, is 142° to 143° centigrade, and that of the semicarbazone of ionone is 110° to 112° centigrade.

Iso-ionone has an odor similar to that of ionone and, like the latter, should find application in perfumery, confectionery, and distilleries, &c.

Iso-ionone is, like ionone, optically inactive.

As Tiemann has shown in the specification No. 556,943 and as I have also said, pseudo-ionone is converted by acids first into ionone. It follows that in the manufacture of iso-ionone for the ionone used as the raw material may be substituted the same proportion of pseudo-ionone, the rest of the procedure being as I have set forth.

By the action of hydriodic acid at a high temperature iso-ionone is converted, like ionone under the same conditions, into a hydrocarbon of the formula $C_{13}H_{18}$. This hydrocarbon, when attacked by powerful oxidizing agents—potassium permanganate, for example—yields an acid of the formula $C_{12}H_{12}O_6$, melting at 214° centigrade.

Having now particularly described and ascertained the nature of this invention and in what manner the same is to be performed, I declare that what I claim is—

1. The described method of producing an isomerid of ionone, by treating ionone or pseudo-ionone with a concentrated condensing-acid, such as sulfuric acid, as set forth.

2. The described isomerid of ionone, boiling in a pure state at about 140° centigrade, having a specific gravity of 0.946 at 17° centigrade, and having an odor of violets, as set forth.

In witness whereof I have hereunto signed my name in the presence of two subscribing witnesses.

EDGAR DE LAIRE.

Witnesses:
EDWARD P. MACLEAN,
ALEXANDRE MATHIEN.